UNITED STATES PATENT OFFICE.

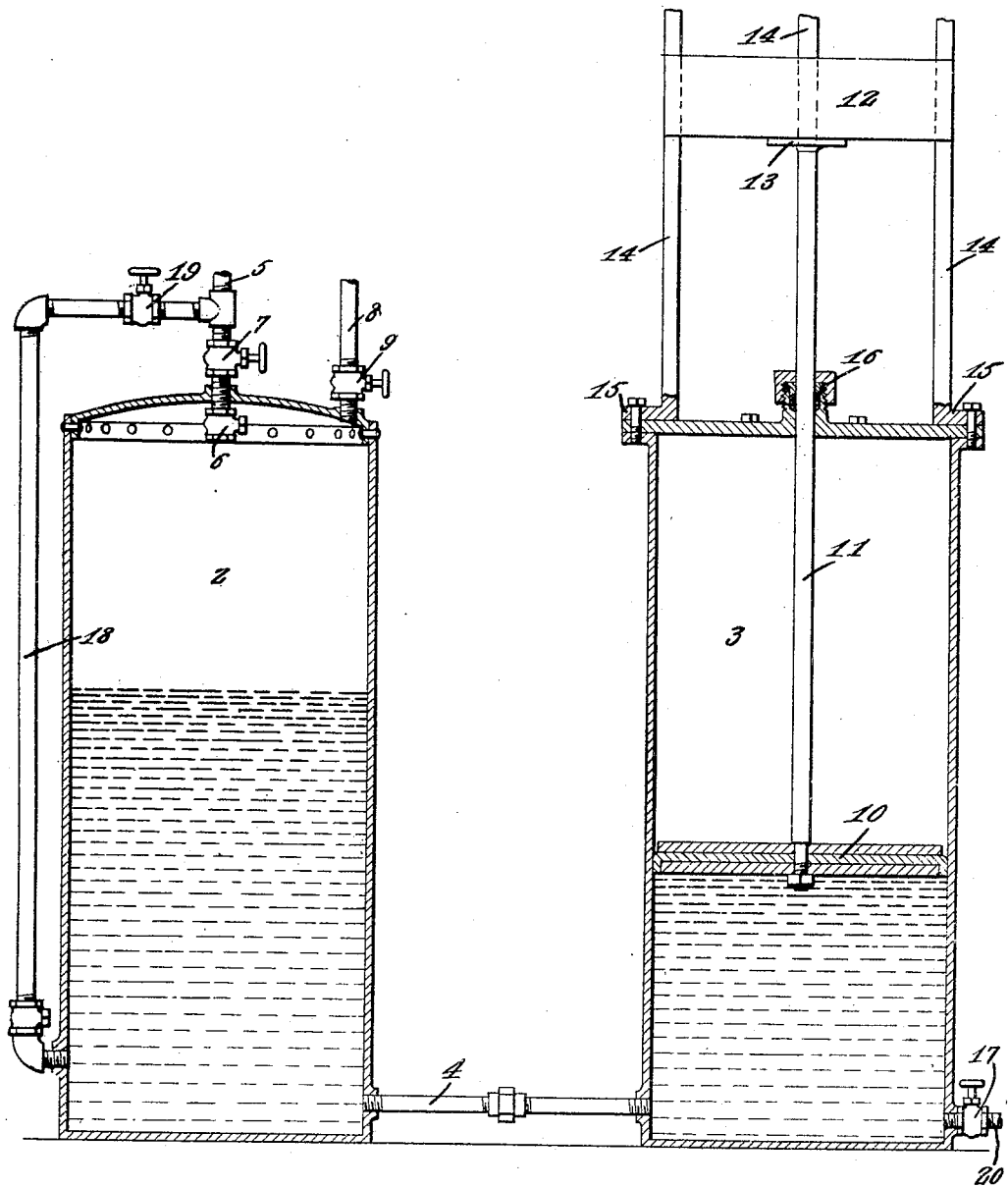

PATRICK HENRY QUIGLEY, OF WINNETT, MONTANA.

APPARATUS FOR STORAGE OF COMPRESSED AIR.

1,376,359.

Specification of Letters Patent. Patented Apr. 26, 1921.

Application filed March 29, 1919. Serial No. 286,207.

*To all whom it may concern:*

Be it known that I, PATRICK HENRY QUIGLEY, a citizen of the United States, residing at Winnett, in the county of Fergus and State of Montana, have invented a new and useful Apparatus for Storage of Compressed Air, of which the following is a specification.

This invention relates to improvements in apparatus for the storage of compressed air, the primary object of the invention being to provide an apparatus whereby the air pressure is maintained uniform at all times.

A further object of the invention is to provide an apparatus of this character in which use is made of the combined action of water and weight for maintaining the uniformity of the air pressure, and which apparatus may be used as a fire extinguisher whereby it will be possible to force water from the level of a basement over the top of an ordinary building.

With these and other objects in view, which will appear as the description proceeds, the invention consists in the novel features of construction and combination of parts hereinafter more fully described, and finally pointed out in the claim.

The drawing accompanying and forming part of this specification is a vertical sectional view of one form of apparatus embodying the features of my invention.

In the embodiment herein shown, 2 and 3 designate a pair of tanks of any suitable size, which are connected together near their lower ends by means of a pipe 4. The tank 2 is provided with an inlet pipe 5, shown broken away and having a conventional form of check valve 6 and a suitable cut-off valve 7. This tank is also provided with an outlet pipe 8, shown broken away and provided with a cut-off valve 9.

The interior of the tank 3 is made smooth for the reception of a piston 10 having connected thereto a piston rod 11, which extends up through a stuffing box 16 in the top of the tank and carries at its upper end a box 12 of any suitable form, the box being seated on a collar 13 secured to the piston rod so that the box is adapted to be moved up and down when the piston is operated. For guiding the box in its reciprocating movements and for maintaining it in upright position, I provide a plurality of rods 14, which may be supported on top of the tank 3 and each provided with a perforated lug 15 for securing it to the top of the tank, the box is provided with openings within its frame through which said rods pass, as shown in dotted lines. This box is adapted to carry a predetermined weight by means of which pressure is exerted on the piston and thereby on the air in tank 2 through the intervention of water in the tanks. The tank 2 may be further provided with an additional supply pipe 18, also having a cut-off valve 19, this pipe entering the tank near its lower end and having a suitable form of check valve. The purpose of this additional supply pipe is to permit air to be forced up through the water in tank 2 thereby to raise the temperature of such water. It is, of course, understood that springs may be used as an equivalent means of maintaining pressure on the piston, but I prefer the form of the apparatus shown in the drawing, since by means of this construction it is an easy matter to change the pressure at any time it may be desired to do so.

In the use of the apparatus above described, the tank 2 is nearly filled with water and a predetermined weight is placed in box 12. Air is then forced under pressure into the tank, the air cushioning above the water and forcing such water through pipe 4 into tank 3. Any suitable means for supplying air to the tank 2 may be employed, a wind mill being about the most economical means. The water forced into tank 3 acts on the piston 10 and forces the box upward until all the water is within tank 3 and the air in tank 2 is fully compressed. When the compressed air is to be used, the outlet valve 9 is opened and, owing to the pressure of the weight on the piston, acting through the water on such compressed air, the air is not permitted to expand within the tank, but is kept at a uniform pressure until entirely used. On the other hand, when it is desired to use the apparatus for the supply of water, as a fire extinguisher for example, a suitable hose may be connected to the outlet 20 and the valve 17 opened, whereupon, owing to the combined pressure of the air and the weight on the water, the latter may be forced to a considerable height above the level of the apparatus, and which pressure will be uniformly maintained until all the water in the tank is exhausted.

It will thus be seen that I have provided an apparatus by means of which the action of a weight is made use of to maintain the air at uniform pressure until completely used, while when the water is to be used the combined action of the compressed air and the weight will maintain the flow of water at uniform pressure until the tank is exhausted.

While I have described in detail the apparatus as herein illustrated, I do not desire to limit my invention to the precise features of construction shown, as I am aware that many mechanical changes may be made without departing from the spirit and scope of the invention as set forth in the appended claim.

Having thus described my invention, what I claim is:

In apparatus of the class described the combination with a tank and guides, of a weight container slidable on the guides, a rod extending downwardly therefrom and into the tank, a piston connected to the rod, a valved water outlet extending from the lower portion of the tank, a second tank, means for maintaining communication between the lower portions of the two tanks, means for directing air under pressure into the upper portion of the second tank thereby to expel water from said second tank and into the lower portion of the first tank to elevate the piston and the weight holding container, and means for directing air into the second tank and upwardly through the liquid contents thereof thereby to cool said contents.

In testimony that I claim the foregoing as my own, I have hereto affixed my signature in the presence of two witnesses.

PATRICK HENRY QUIGLEY.

Witnesses:
L. A. HOYLE,
S. C. SPEARO.